US010530479B2

(12) United States Patent
Chow et al.

(10) Patent No.: US 10,530,479 B2
(45) Date of Patent: Jan. 7, 2020

(54) SYSTEMS WITH OPTICAL NETWORK UNITS (ONUS) FOR HIGH BANDWIDTH CONNECTIVITY, AND RELATED COMPONENTS AND METHODS

(71) Applicant: Corning Optical Communications LLC, Charlotte, NC (US)

(72) Inventors: Bruce Cinkai Chow, Marvin, NC (US); Anthony Ng'Oma, Horseheads, NY (US); Michael S Pambianchi, Corning, NY (US); Michael Sauer, Corning, NY (US)

(73) Assignee: Corning Optical Communications LLC, Charlotte, NC (US)

( * ) Notice: Subject to any disclaimer, the term of this patent is extended or adjusted under 35 U.S.C. 154(b) by 28 days.

(21) Appl. No.: 15/241,247

(22) Filed: Aug. 19, 2016

(65) Prior Publication Data
US 2016/0359564 A1    Dec. 8, 2016

Related U.S. Application Data

(63) Continuation of application No. 13/410,936, filed on Mar. 2, 2012, now Pat. No. 10,110,307.

(51) Int. Cl.
*H04B 10/50* (2013.01)
*H04B 10/2575* (2013.01)
(Continued)

(52) U.S. Cl.
CPC .......... *H04B 10/25753* (2013.01); *H04J 1/02* (2013.01); *H04L 12/2898* (2013.01); *H04Q 11/0067* (2013.01); *H04Q 11/0071* (2013.01)

(58) Field of Classification Search
CPC ............. H04B 10/25752; H04B 10/27; H04B 7/0617; H04B 7/0691
See application file for complete search history.

(56) References Cited

U.S. PATENT DOCUMENTS 4,941,207 A    7/1990    Maeda et al.
5,214,395 A *  5/1993    Yun ............ H03B 1/04
                                           330/286
(Continued)

FOREIGN PATENT DOCUMENTS

AU    2003203591 A1    3/2004
CN    101095971 A      1/2008
(Continued)

OTHER PUBLICATIONS

Author Unknown, "Fiber Optic Distributed Antenna System," Installation and Users Guide, ERAU Version 1.5, May 2002, Andrews Corporation, 53 pages.
(Continued)

*Primary Examiner* — Tanya T Motsinger
(74) *Attorney, Agent, or Firm* — C. Keith Montgomery

(57) ABSTRACT

Optical network units (ONUs) for high bandwidth connectivity, and related components and methods are disclosed. A fiber optical network ends at an ONU, which may communicate with a subscriber unit wirelessly at an extremely high frequency avoiding the need to bury cable on the property of the subscriber. In one embodiment, an optical network unit (ONU) is provided. The ONU comprises a fiber interface configured to communicate with a fiber network. The ONU further comprises an optical/electrical converter configured to receive optical downlink signals at a first frequency from the fiber network through the fiber interface and convert the optical downlink signals to electrical downlink signals. The ONU further comprises electrical circuitry configured to frequency convert electrical downlink signals to extremely high frequency (EHF) downlink signals at an EHF, and a wireless transceiver configured to transmit the EHF downlink signals to a proximate subscriber unit through an antenna.

13 Claims, 9 Drawing Sheets

(51) Int. Cl.
*H04Q 11/00* (2006.01)
*H04L 12/28* (2006.01)
*H04J 1/02* (2006.01)

(56) References Cited

U.S. PATENT DOCUMENTS

| | | | |
|---|---|---|---|
| 5,751,789 A | 5/1998 | Farris et al. | |
| 5,790,631 A | 8/1998 | Minarczik et al. | |
| 5,835,128 A | 11/1998 | Macdonald et al. | |
| 5,877,565 A | 3/1999 | Hollenbach et al. | |
| 5,930,704 A | 7/1999 | Kay | |
| 5,969,837 A | 10/1999 | Farber et al. | |
| 5,994,998 A | 11/1999 | Fisher et al. | |
| 6,049,593 A | 4/2000 | Acampora | |
| 6,181,954 B1 | 1/2001 | Monroe et al. | |
| 6,205,185 B1 | 3/2001 | Kajiwara | |
| 6,314,163 B1 | 11/2001 | Acampora | |
| 6,486,907 B1 | 11/2002 | Farber et al. | |
| 6,493,875 B1 | 12/2002 | Eames et al. | |
| 6,560,334 B1 | 5/2003 | Mullaney et al. | |
| 6,647,015 B2 | 11/2003 | Malkemes et al. | |
| 6,741,781 B2 | 5/2004 | Furuyama | |
| 6,831,921 B2 | 12/2004 | Higgins | |
| 6,871,081 B1 | 3/2005 | Llewellyn et al. | |
| 6,882,801 B2 | 4/2005 | Imajo | |
| 6,885,845 B1 | 4/2005 | Crowley et al. | |
| 6,895,185 B1 | 5/2005 | Chung et al. | |
| 6,978,474 B1 | 12/2005 | Sheppard et al. | |
| 7,006,847 B2 | 2/2006 | Sato et al. | |
| 7,027,431 B1 | 4/2006 | Thompson | |
| 7,072,586 B2 | 7/2006 | Aburakawa et al. | |
| 7,135,956 B2 | 11/2006 | Bartone et al. | |
| 7,136,426 B2 | 11/2006 | Okada et al. | |
| 7,146,180 B1 | 12/2006 | Liu | |
| 7,181,142 B1 * | 2/2007 | Xu | H04J 3/14 398/66 |
| 7,302,224 B2 | 11/2007 | Sibley et al. | |
| 7,366,150 B2 | 4/2008 | Lee et al. | |
| 7,369,838 B1 | 5/2008 | Murray et al. | |
| 7,379,669 B2 | 5/2008 | Kim | |
| 7,409,159 B2 | 8/2008 | Izadpanah | |
| 7,450,854 B2 | 11/2008 | Lee et al. | |
| 7,565,080 B2 | 6/2009 | Mickelsson et al. | |
| 7,583,896 B2 | 9/2009 | Taniguchi et al. | |
| 7,610,050 B2 | 10/2009 | Sayers et al. | |
| 7,630,608 B2 | 12/2009 | Gallagher | |
| 7,672,591 B2 * | 3/2010 | Soto | H04B 10/808 398/66 |
| 7,814,717 B2 | 10/2010 | Wang | |
| 7,827,581 B1 | 11/2010 | Eiger et al. | |
| 7,861,272 B2 | 12/2010 | Russ et al. | |
| 7,917,931 B2 | 3/2011 | Bertonis et al. | |
| 7,957,777 B1 | 6/2011 | Vu et al. | |
| 7,990,908 B2 | 8/2011 | Binder | |
| 8,023,886 B2 | 9/2011 | Rofougaran | |
| 8,023,997 B2 | 9/2011 | Hoiness et al. | |
| 8,073,329 B2 | 12/2011 | Gao et al. | |
| 8,098,990 B2 | 1/2012 | Hu et al. | |
| 8,107,815 B2 | 1/2012 | Akasaka et al. | |
| 8,175,459 B2 | 5/2012 | Thelen et al. | |
| 8,184,681 B2 | 5/2012 | Binder et al. | |
| 8,270,833 B2 | 9/2012 | Lin et al. | |
| 8,325,759 B2 | 12/2012 | Hazani et al. | |
| 8,351,792 B2 * | 1/2013 | Zheng | H04W 92/14 370/328 |
| 8,374,180 B2 | 2/2013 | Woo et al. | |
| 8,374,508 B2 | 2/2013 | Soto et al. | |
| 8,422,883 B2 | 4/2013 | Yeh et al. | |
| 8,422,884 B2 | 4/2013 | Mao | |
| 8,452,178 B2 | 5/2013 | Gao et al. | |
| 8,488,966 B2 | 7/2013 | Zheng | |
| 8,548,330 B2 | 10/2013 | Berlin et al. | |
| 8,559,939 B2 | 10/2013 | Sabat, Jr. et al. | |
| 8,599,958 B2 | 12/2013 | Schwartz et al. | |
| 8,630,300 B2 | 1/2014 | Edmon | |
| 8,634,764 B2 | 1/2014 | Cruz et al. | |
| 8,639,121 B2 | 1/2014 | George et al. | |
| 8,644,844 B2 | 2/2014 | Shapira et al. | |
| 8,649,684 B2 | 2/2014 | Casterline et al. | |
| 8,660,477 B2 | 2/2014 | Murray et al. | |
| 8,671,431 B2 | 3/2014 | Centore, III et al. | |
| 8,677,423 B2 | 3/2014 | Hicks, III et al. | |
| 8,682,171 B1 | 3/2014 | Britz et al. | |
| 8,737,454 B2 | 5/2014 | Wala et al. | |
| 8,750,266 B2 | 6/2014 | de Lind van Wijngaarden | |
| 8,761,050 B2 | 6/2014 | Lu et al. | |
| 8,824,457 B2 | 9/2014 | Bianchi et al. | |
| 8,929,740 B2 | 1/2015 | Smith et al. | |
| 8,947,319 B2 | 2/2015 | Simmons et al. | |
| 8,976,670 B2 | 3/2015 | Meier et al. | |
| 9,258,629 B2 | 2/2016 | Graves et al. | |
| 9,264,741 B2 | 2/2016 | Murray et al. | |
| 9,307,297 B2 | 4/2016 | Richman et al. | |
| 9,332,014 B2 | 5/2016 | Keiser et al. | |
| 9,332,402 B2 | 5/2016 | Wala | |
| 9,344,183 B2 | 5/2016 | Eiger et al. | |
| 9,391,723 B2 | 7/2016 | Matthews | |
| 9,414,137 B2 | 8/2016 | Smith et al. | |
| 9,419,715 B2 | 8/2016 | Samsuri et al. | |
| 9,553,669 B2 | 1/2017 | Khemakhem et al. | |
| 9,571,190 B2 | 2/2017 | Britz et al. | |
| 9,871,564 B1 | 1/2018 | Gu et al. | |
| 2002/0111077 A1 | 8/2002 | Keenum | |
| 2002/0122230 A1 | 9/2002 | Izadpanah et al. | |
| 2002/0131123 A1 * | 9/2002 | Clark | H04B 10/1125 398/118 |
| 2002/0128009 A1 * | 10/2002 | Boch et al. | H04W 88/021 455/426.2 |
| 2004/0054425 A1 | 3/2004 | Elmore | |
| 2004/0110468 A1 | 6/2004 | Perlman | |
| 2004/0151503 A1 | 8/2004 | Kashima et al. | |
| 2004/0175173 A1 | 9/2004 | Deas | |
| 2004/0203703 A1 | 10/2004 | Fischer | |
| 2005/0018653 A1 | 1/2005 | Phillips et al. | |
| 2005/0025505 A1 | 2/2005 | Soto et al. | |
| 2005/0058451 A1 | 3/2005 | Ross | |
| 2005/0093766 A1 * | 5/2005 | Turner | H01Q 1/1235 343/900 |
| 2005/0114023 A1 * | 5/2005 | Williamson | G01C 21/165 701/472 |
| 2005/0289623 A1 | 12/2005 | Midani et al. | |
| 2006/0045524 A1 | 3/2006 | Lee et al. | |
| 2006/0045525 A1 | 3/2006 | Lee et al. | |
| 2006/0067709 A1 * | 3/2006 | Newberg | H01Q 3/2676 398/188 |
| 2006/0153517 A1 * | 7/2006 | Reagan | G02B 6/3897 385/135 |
| 2006/0182446 A1 | 8/2006 | Kim et al. | |
| 2006/0209857 A1 | 9/2006 | Hicks, III | |
| 2006/0253045 A1 * | 11/2006 | Coifman | A61B 5/0871 600/538 |
| 2007/0019956 A1 | 1/2007 | Sorin et al. | |
| 2007/0112939 A1 | 5/2007 | Wilson et al. | |
| 2007/0224951 A1 * | 9/2007 | Gilb | H01Q 3/26 455/127.5 |
| 2007/0261060 A1 * | 11/2007 | Manzano | G06F 9/4862 719/317 |
| 2007/0286172 A1 | 12/2007 | Duran et al. | |
| 2007/0286405 A1 | 12/2007 | Blake et al. | |
| 2008/0013957 A1 | 1/2008 | Akers et al. | |
| 2008/0056224 A1 | 3/2008 | Hoiness et al. | |
| 2008/0063397 A1 | 3/2008 | Hu et al. | |
| 2008/0124086 A1 | 5/2008 | Matthews | |
| 2008/0132188 A1 | 6/2008 | Nino et al. | |
| 2008/0159744 A1 | 7/2008 | Soto et al. | |
| 2008/0166094 A1 | 7/2008 | Bookbinder et al. | |
| 2008/0200122 A1 | 8/2008 | Mann | |
| 2008/0224869 A1 * | 9/2008 | Kaplan | G06K 7/10306 340/572.1 |
| 2008/0225375 A1 * | 9/2008 | Newberg | G02B 6/122 359/279 |
| 2008/0260389 A1 | 10/2008 | Zheng | |
| 2009/0003221 A1 | 1/2009 | Burns et al. | |

(56) References Cited

U.S. PATENT DOCUMENTS

| | | | |
|---|---|---|---|
| 2009/0013210 | A1 | 1/2009 | McIntosh et al. |
| 2009/0047016 | A1 | 2/2009 | Bernard et al. |
| 2009/0047023 | A1 | 2/2009 | Pescod et al. |
| 2009/0060531 | A1 | 3/2009 | Biegert et al. |
| 2009/0135068 | A1 | 5/2009 | Cohen |
| 2009/0169163 | A1 | 7/2009 | Abbott, III et al. |
| 2010/0014868 | A1 | 1/2010 | McGlynn et al. |
| 2010/0040372 | A1* | 2/2010 | Gejbrowitz ...... H04B 10/25754 398/71 |
| 2010/0142955 | A1 | 6/2010 | Yu et al. |
| 2010/0150556 | A1 | 6/2010 | Soto et al. |
| 2010/0150566 | A1* | 6/2010 | Soto ............... H04B 10/272 398/115 |
| 2010/0158525 | A1 | 6/2010 | Walter |
| 2010/0197222 | A1 | 8/2010 | Scheucher |
| 2010/0209066 | A1 | 8/2010 | Anderson et al. |
| 2010/0239253 | A1 | 9/2010 | Lin et al. |
| 2011/0019999 | A1 | 1/2011 | George et al. |
| 2011/0055875 | A1* | 3/2011 | Zussman ............ H04Q 11/0067 725/65 |
| 2011/0139942 | A1 | 6/2011 | Moore et al. |
| 2011/0200325 | A1 | 8/2011 | Kobyakov et al. |
| 2011/0206383 | A1 | 8/2011 | Chien et al. |
| 2011/0268446 | A1 | 11/2011 | Cune et al. |
| 2011/0274433 | A1* | 11/2011 | Presi .............. H04B 10/25759 398/97 |
| 2011/0311033 | A1 | 12/2011 | Binder |
| 2012/0114076 | A1 | 5/2012 | Morton et al. |
| 2012/0257893 | A1 | 10/2012 | Boyd et al. |
| 2012/0309325 | A1* | 12/2012 | Carbone ............ H04B 1/40 455/73 |
| 2013/0034335 | A1 | 2/2013 | Landry et al. |
| 2013/0089336 | A1 | 4/2013 | Dahlfort et al. |
| 2013/0106641 | A1* | 5/2013 | Warke .............. H04L 27/0014 342/21 |
| 2013/0201316 | A1 | 8/2013 | Binder et al. |
| 2013/0217336 | A1* | 8/2013 | McCormack ........ H04W 8/085 455/41.2 |
| 2013/0230325 | A1 | 9/2013 | Chow et al. |
| 2013/0266324 | A1 | 10/2013 | Diab et al. |
| 2014/0233951 | A1* | 8/2014 | Cook ............... H04L 63/02 398/67 |
| 2014/0314061 | A1 | 10/2014 | Trajkovic et al. |
| 2015/0078756 | A1 | 3/2015 | Soto et al. |
| 2015/0098419 | A1 | 4/2015 | Zavadsky et al. |
| 2015/0125146 | A1 | 5/2015 | Erreygers et al. |
| 2015/0236787 | A1 | 8/2015 | Cook |
| 2016/0134008 | A1 | 5/2016 | Kim et al. |
| 2016/0241339 | A1* | 8/2016 | Berlin ............. H04B 10/2575 |
| 2016/0301474 | A1 | 10/2016 | Bourg et al. |
| 2017/0195054 | A1 | 7/2017 | Ashrafi |
| 2017/0215090 | A1 | 7/2017 | Lipowski et al. |
| 2017/0365908 | A1 | 12/2017 | Hughes et al. |
| 2018/0026722 | A1 | 1/2018 | Ashrafi |
| 2018/0090992 | A1 | 3/2018 | Shrivastava et al. |
| 2018/0129172 | A1 | 5/2018 | Shrivastava et al. |
| 2018/0248612 | A1 | 8/2018 | Graham, III et al. |
| 2018/0262272 | A1 | 9/2018 | Ashrafi |
| 2018/0278334 | A1 | 9/2018 | Ashrafi |
| 2018/0366815 | A1* | 12/2018 | Rheinfelder .......... H01Q 1/246 |
| 2018/0376228 | A1* | 12/2018 | Erreygers .............. H04B 10/25 |

FOREIGN PATENT DOCUMENTS

| | | |
|---|---|---|
| CN | 203117847 U | 8/2013 |
| CN | 103619080 A | 3/2014 |
| CN | 105591185 A | 5/2016 |
| DE | 69130642 T2 | 9/1999 |
| DE | 69704862 T2 | 8/2001 |
| EP | 1128651 A2 | 8/2001 |
| EP | 1250728 B1 | 4/2004 |
| EP | 2180614 A1 | 4/2010 |
| FR | 2838000 A1 | 10/2003 |
| GB | 693435 A | 7/1953 |
| GB | 1418447 A | 12/1975 |
| GB | 2460500 A | 12/2009 |
| JP | 10013121 A | 1/1998 |
| JP | 2000101499 A | 4/2000 |
| JP | 2001069150 A | 3/2001 |
| JP | 2002026953 A | 1/2002 |
| JP | 2004197993 A | 7/2004 |
| JP | 2009010595 | 1/2009 |
| JP | 04256109 B2 | 4/2009 |
| JP | 2011210810 A | 10/2011 |
| JP | 2012018645 A | 1/2012 |
| JP | 05057487 B2 | 10/2012 |
| JP | 2014064360 A | 4/2014 |
| KR | 2005005909 A | 1/2005 |
| KR | 899228 B1 | 5/2009 |
| KR | 900268 B1 | 5/2009 |
| KR | 2010013586 A | 2/2010 |
| KR | 2010016832 A | 2/2010 |
| KR | 2010060321 A | 6/2010 |
| KR | 2011062716 A | 6/2011 |
| KR | 1077532 B1 | 10/2011 |
| KR | 1155568 B1 | 6/2012 |
| KR | 2014004455 A | 1/2014 |
| KR | 1403978 B1 | 6/2014 |
| KR | 2014090002 A | 7/2014 |
| WO | 9631983 A1 | 10/1996 |
| WO | 0067458 A1 | 11/2000 |
| WO | 0156233 A1 | 8/2001 |
| WO | 2011139942 A1 | 11/2011 |
| WO | 2013130921 A1 | 9/2013 |

OTHER PUBLICATIONS

Author Unknown, "2Wire Unveils World's First Outdoor Broadband Home Gateway," PRNewswire, Jan. 5, 2006, 2Wire, Inc., 4 pages.

Author Unknown, "Outrigger Media Access Portal (MAP) take Triple Play service delivery to the next level," Product Specification, NY-MDS-125, Oct. 2008, tii Network Technologies, Inc., 2 pages.

Author Unknown, "Turn Broadband Inside Out: HomePortal iNID Outdoor Residential Gateway," Product Specification, Revision B, Jan. 2007, 2Wire, Inc., 2 pages.

Cartaxo, Adolfo, et al., "A Perspective on Optical-Wireless Converged NG-FTTH Networks Using Directly Modulated Lasers," International Conference on Transparent Optical Networks, Jun. 26-30, 2011, 4 pages.

Clark, Jack, "Google Plots Cheaper Wireless Future to Expand Fiber Project," Bloomberg News, Jul. 28, 2016, Bloomberg L.P., 6 pages.

D'Onfro, Von Jillian, "Google is expanding its tests on the way to blanketing the US in super-fast wireless internet," Business Insider, Aug. 11, 2016, 2 pages.

Llorente, Roberto, et al., "Fully Converged Optical, Millimetre-Wave Wireless and Cable Provision in OFDM-PON FTTH Networks," International Conference on Transparent Optical Networks, Jun. 23-27, 2013, 4 pages.

International Search Report and Written Opinion for PCT/US2007/019203, dated May 14, 2008, 9 pages.

International Preliminary Report on Patentability for PCT/US2007/019203, dated Mar. 3, 2009, 7 pages.

International Search Report for PCT/US2013/028493, dated Jun. 24, 2013, 4 pages.

Non-Final Office Action for U.S. Appl. No. 11/513,941, dated Mar. 29, 2010, 11 pages.

Final Office Action for U.S. Appl. No. 11/513,941, dated Sep. 17, 2010, 16 pages.

Advisory Action for U.S. Appl. No. 11/513,941, dated Dec. 7, 2010, 3 pages.

Non-Final Office Action for U.S. Appl. No. 13/410,936, dated Jan. 26, 2015, 13 pages.

Final Office Action for U.S. Appl. No. 13/410,936, dated Jul. 22, 2015, 19 pages.

(56) References Cited

OTHER PUBLICATIONS

Advisory Action for U.S. Appl. No. 13/410,936, dated Sep. 17, 2015, 3 pages.
Non-Final Office Action for U.S. Appl. No. 13/410,936, dated Feb. 25, 2016, 25 pages.
Final Office Action for U.S. Appl. No. 13/410,936, dated Aug. 24, 2016, 24 pages.
Examiner's Answer to the Appeal Brief for U.S. Appl. No. 13/410,936, dated Apr. 6, 2017, 29 pages.
Non-Final Office Action for U.S. Appl. No. 15/090,709, dated Mar. 3, 2017, 13 pages.
Koonen, T, "Fiber to the Home/Fiber to the Premises: What, Where, and When?," IEEE, vol. 94, No. 5, May 1, 2006, pp. 911-934.
Yu-Min, Lin et al., "Next Generation OFDMA-based passive optical network architecture supporting radio-over-fiber," IEEE Journal on Selected Areas in Communications, vol. 28, No. 6, Aug. 1, 2010, pp. 791-799.
T. Yoshie, et al.., Advanced Wireless IP Access System (WIPAS) for Fixed Wireless Access (FWA)-Broadband Access Systems for triple place services by "Fiber + Radio",Proceedings of the 19th Annual IEEE Internation Symposium on Personal, Indoor and Mobile Radio Communications (PIMRC '08, 2008.
Y. Kimura, A Low-Cost and Very Compact Wireless Terminal Integrated on the Back of a Waveguide Planar Array for 26 GHz Band Fixed Wireless Access (FWA) Systems, IEEE Transactions on Antennas and Propagation, vol. 53, No. 8, Aug. 2005.
W. Webb, Broadband Fixed Wireless Access as a Key Component of the Future Integrated Communications Environment, IEEE Communications Magazine, Sep. 2001.
Wireless bridge takes high-speed communications to 'last mile', Feb. 28, 2012, Sify.com News.
Examination Report for European Patent Application No. 13709679. 8, dated May 11, 2017, 5 pages.
"Digital." Focal Dictionary of Telecommunications, Focai Press. Xerxes Mazda and F.F. Mazda. London: Routledge, 1999.Credo Reference. Web. Feb. 19, 2016.
"Pulse Amplitude Modulation (Pam)." Focal Dictionary of Telecommunications, Focal Press, Xerxes Mazda, and F.F. Mazda,Routledge, 1999. Credo Reference, http://search.credoreference.com/content/entry/bhfidt/pulse_amplitude_modulation_pam/0. Accessed Aug. 9, 2016.
International Search Report of the International Searching Authority; PCT/US2013/028493; dated Jun. 24, 2013; 4 Pages; European Patent Office.
Decision on Appeal for U.S. Appl. No. 13/410,936, dated Jan. 31, 2018, 12 pages.
Notice of Allowance for U.S. Appl. No. 13/410,936, dated Jul. 27, 2018, 8 pages.
Non-Final Office Action for U.S. Appl. No. 15/797,477, dated Apr. 18, 2019, 23 pages.

\* cited by examiner

SYSTEMS WITH OPTICAL NETWORK UNITS (ONUS) FOR HIGH BANDWIDTH CONNECTIVITY, AND RELATED COMPONENTS AND METHODS

RELATED APPLICATION

The application is a continuation application of U.S. application Ser. No. 13/410,936 filed Mar. 2, 2012, the content of which is relied upon and incorporated by reference in its entirety and the benefit of priority under 35 U.S.C. § 120 is hereby claimed.

BACKGROUND

Field of the Disclosure

The technology of the disclosure relates to providing high bandwidth connections to subscriber facilities.

Technical Background

The internet is evolving in response to perceived demands on it from both consumers and content providers. The consumers are perceived to desire the ability to download audio and video content without degradation of the content from compression or the like. This desire results in a perceived demand for greater bandwidth. Similarly, content providers have a desire to be able to charge for content delivered to a consumer when the consumer requests the content (i.e. "on demand" video). Such content delivery is bandwidth intensive. Thus, both sides of the consumer-provider relationship have a perceived desire for greater bandwidth.

The advent of streaming high definition video has only exacerbated this demand. Current twisted wire solutions are not capable of providing the bandwidth necessary to provide the desired content at the desired quality levels. While coaxial cable solutions initially offered the promise of being able to provide desired bandwidth, as more subscribers use the cable network, the available bandwidth has to be shared between these subscribers, resulting in unacceptable degradation of quality. Similarly, while satellite based systems have offered large downlink bandwidths, uplink bandwidths have proven relatively narrow or require a terrestrial based uplink. Additionally, satellite systems sometimes exhibit the more serious problem of long latency. Neither solution is attractive and relegates the satellite systems to a marginally acceptable solution.

Communication networks using optical fiber as the primary uplink and downlink media have proven capable of accommodating the heavy bandwidth requirements. However, fiber optical networks have not seen widespread deployment beyond central office to central office connection. Occasionally, the optical fiber network has been extended to a community head end or other remote location, but individual subscribers still rely on copper solutions to provide service from the head end or remote location to the subscriber unit. Expense and inconvenience of providing buried fiber optical cables from the head end or remote location to the subscriber unit have slowed further expansion of the fiber optical network. Thus, to date, fiber to the house (FTTH) has not been realized, and subscribers are still perceived to desire streamed high definition quality video.

SUMMARY OF THE DETAILED DESCRIPTION

Embodiments disclosed herein include optical network units (ONUs) for high bandwidth connectivity. Related components and methods are also disclosed including subscriber units and systems. The systems may include both ONUs and subscriber units. A fiber optical network ends at an ONU, which may communicate with a subscriber unit wirelessly at an extremely high frequency avoiding the need to bury cable on the property of the subscriber.

In this regard, in one embodiment, an optical network unit (ONU) is provided. The ONU comprises an optical fiber interface configured to communicate with a fiber network. The ONU further comprises an optical/electrical converter configured to receive optical downlink signals at a first frequency from the fiber network through the fiber interface and convert the optical downlink signals to electrical downlink signals. The ONU further comprises electrical circuitry configured to frequency convert the electrical downlink signals to extremely high frequency (EHF) downlink signals at an EHF and a wireless transceiver configured to transmit the EHF downlink signals to a proximate subscriber unit through an antenna.

In another embodiment, a method of operating an ONU is provided. The method comprises communicating with a fiber network via a fiber interface and receiving, at an optical/electrical converter, optical downlink signals at a first frequency from the fiber network through the fiber interface. The method further comprises converting, at the optical/electrical converter, the optical downlink signals to electrical downlink signals and frequency converting the electrical downlink signals to extremely high frequency (EHF) downlink signals at an EHF. The method further comprises transmitting the EHF downlink signals to a proximate subscriber unit through an antenna.

In another embodiment, a subscriber unit is provided. The subscriber unit comprises an antenna configured to operate at an extremely high frequency (EHF) range and a transceiver configured to transmit EHF uplink signals to a proximate optical network unit (ONU) for transmission over a fiber network, the transceiver further configured to receive EHF downlink signals from the ONU.

In another embodiment a system is provided. The system comprises an ONU and a subscriber unit. The ONU comprises a fiber interface configured to communicate with a fiber network and an optical/electrical converter configured to receive optical downlink signals at a first frequency from the fiber network through the fiber interface and convert the optical downlink signals to electrical downlink signals. The ONU further comprises electrical circuitry configured to frequency convert the electrical downlink signals to extremely high frequency (EHF) downlink signals at an EHF and a wireless transceiver configured to transmit the EHF downlink signals to a proximate subscriber unit through an ONU antenna. The subscriber unit comprises a subscriber antenna configured to operate at an EHF range and a transceiver configured to receive the EHF downlink signals from the ONU.

As non-limiting examples, the extremely high frequency may be approximately 60 GHz and various techniques such as frequency division multiplexing and polarization selection may be used to reduce interference between subscriber units. While the text of the present disclosure may initially address the downlink, it should be appreciated that the disclosure is not so limited and the teachings also apply to the uplink. In particular, the uplink may also occur in the EHF range and use the various antenna techniques and beam steering techniques to help reduce interference.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include optical network units (ONUs) for high bandwidth connectivity. Related components and methods are also disclosed including subscriber units and systems. The systems include ONUs and subscriber units. A fiber optical network ends at an ONU, which may communicate with a subscriber unit wirelessly at an extremely high frequency avoiding the need to bury cable on the property of the subscriber.

Figure 1:
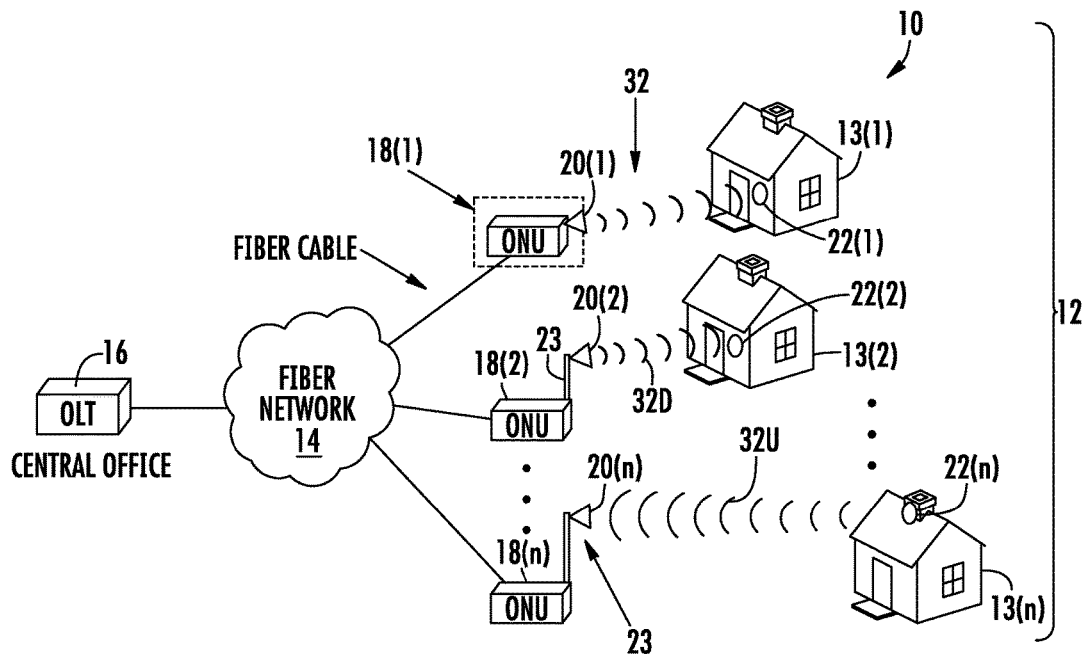
FIG. 1 is simplified diagram of an exemplary fiber network that extends to a street side optical network unit wirelessly communicating with a subscriber unit.

In this regard, FIG. 1 illustrates an exemplary communication system 10 with a neighborhood 12 of subscriber units 13(1)-13(N) served by fiber network 14. The fiber network 14 communicatively couples a central office 16 with one or more ONUs 18(1)-18(N). As is well understood, each ONU 18 may include an optical fiber interface configured to couple the ONU 18 to the fiber network 14 and communicate therewith. That is, the optical fiber interface receives optical downlink signals from the fiber network 14 and sends optical uplink signals from the ONU 18. The optical downlink signals are received at a first frequency. The central office 16 and fiber network 14 may be conventional and may include head end units and other components that are not specifically illustrated but understood in the industry. The subscriber units 13(1)-13(N) may be residential houses, multi-dwelling units, commercial properties, or the like.

With continuing reference to FIG. 1, each ONU 18(1)-18(N) includes an antenna 20(1)-20(N) which wirelessly communicates via wireless link 32 with a corresponding subscriber antenna 22(1)-22(N) at the subscriber unit 13(1)-13(N). Where, relevant, the ONU 18 to subscriber unit 13 link is called the wireless downlink 32D, and the subscriber unit 13 to ONU 18 link is called the wireless uplink 32U otherwise the collective wireless link 32 is used. While FIG. 1 is not intended to be to scale, it should be appreciated that FIG. 1 illustrates that the subscriber antennas 22(1)-22(N) may be at different heights or positions on the subscriber unit 13(1)-13(N) and the antennas 20(1)-20(N) may be positioned on a mast 23 so as to effectuate wireless communications more effectively. In another exemplary embodiment, the antennas 20 may be associated with utility poles or other existing utility structures as desired.

In an exemplary embodiment, the ONUs 18(1)-18(N) communicate with the subscriber unit 13(1)-13(N) using an extremely high frequency (EHF) wireless signal. As used herein, the EHF band ranges from about 30 GHz to about 300 GHz. In a further exemplary embodiment, the communication occurs at approximately 60 GHz (e.g., millimeter wave) in channels having about a seven GHz bandwidth. In the United States, the band 38.6-40.0 GHz is used for licensed high-speed microwave data links, and the 60 GHz band can be used for unlicensed short range (1.7 km) data links with data throughputs in excess of 28Gbit/s while the video standard allows for approximately 5 Gbit/s. The 71-76, 81-86 and 92-95 GHz bands are also used for point-to-point high-bandwidth communication links. These frequencies, as opposed to the 60 GHz frequency, require a transmitting license in the US from the Federal Communications Commission (FCC), though they do not suffer from the effects of oxygen absorption as the 60 GHz does.

As a non-limiting example, by terminating the fiber portion of the communication system 10 at the ONU 18, there is no need to dig or trench in the subscriber's property, and thus, there is no need to secure permission to bury cable all the way to the subscriber unit 13. Likewise, the expense of burying the cable is avoided. Instead of carrying cable all the way to the subscriber unit 13, the wireless link 32 creates a high bandwidth communication link that carries EHF downlink signals to the subscriber unit 13 and receives EHF uplink signals from the subscriber unit 13.

Figure 2A:
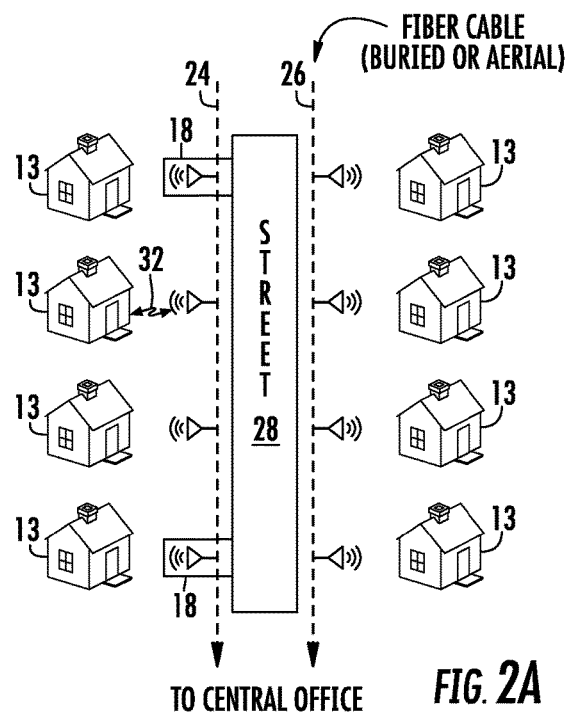
FIG. 2A is simplified diagram of an exemplary neighborhood of subscriber units, each serviced wirelessly by optical network units.
Figure 2B:
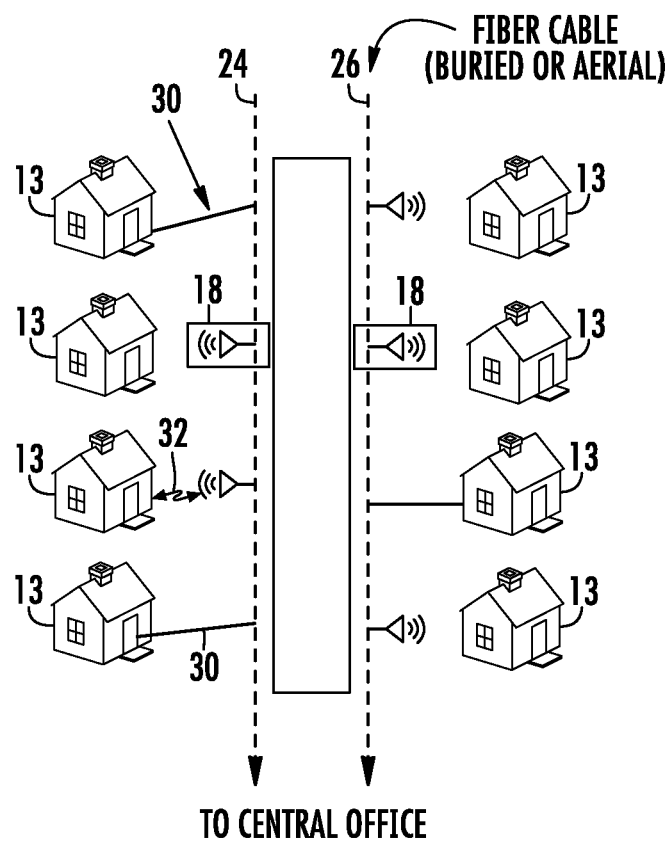
FIG. 2B is a simplified diagram of an exemplary hybrid neighborhood wherein some subscriber units are wirelessly serviced and some have fiber to the subscriber unit.

FIGS. 2A and 2B illustrate two exemplary embodiments of the communication system 10. In FIG. 2A, cables 24, 26 run on either side of a street 28. While described as a street, a road, highway, interstate, sidewalk, or other public right of way with appurtenant existing easements is considered equivalent. A respective ONU 18 is coupled to one of the cables 24, 26 for each subscriber unit 13. Thus, each subscriber unit 13 is served by a respective wireless link 32. The exemplary embodiment of FIG. 2A is appropriate where the utility company is unable or unwilling to secure permission or unwilling to undertake the expense of trenching cable all the way to the subscriber units 13. FIG. 2B illustrates a mixed communication system 10A where some subscribers have consented to and/or requested that cable be run all the way to the subscriber unit 13. In the embodiment of FIG. 2B, subscriber units 13A are served directly by fiber optical cables 30 rather than wireless link 32. However, other subscriber units 13 are still served by wireless links 32. The present disclosure works in both homogenous wireless systems and heterogeneous wired/wireless systems and is not limited to strictly wireless systems.

Figure 3:
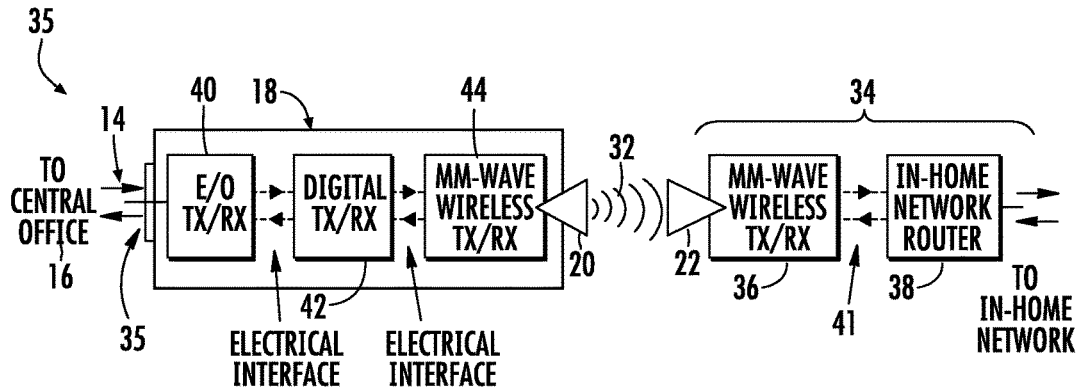
FIG. 3 is a simplified block diagram of an optical network unit and subscriber unit hardware.

FIG. 3 illustrates an exemplary ONU 18 (also sometimes referred to herein as a street node 18), wireless link 32, and the subscriber hardware 34, collectively subscriber module 35. The subscriber hardware 34 may include the subscriber antenna 22, a wireless transceiver 36, and an in-home network router 38. The wireless transceiver 36 may be connected to the in-home network router 38 through an appropriate conventional electrical interface 41. In an exemplary embodiment, the wireless transceiver 36 is a mm-wave wireless transceiver. It should be appreciated that once signals reach the in-home network router 38, the signals may be retransmitted over wires such as CAT5 or CAT6 wires, wirelessly such as through a WIFI, BLUETOOTH or other system as is well understood so that computers, televisions, and other appliances may be used as desired.

With continuing reference to FIG. 3, the ONU 18 includes an optical fiber interface 39 (sometimes referred to herein as a "fiber interface") configured to couple the ONU 18 to the fiber network 14 and allow communication therewith. The ONU 18 further includes an electrical/optical converter and transceiver 40, which is configured to convert optical downlink signals from the fiber network 14 to downlink electrical signals and convert electrical uplink signals to optical uplink signals for transmission on the fiber network 14. As noted above, the fiber network 14 is a high bandwidth network that offers the high bandwidth in both the downlink and the uplink directions and does not suffer from bandwidth degradation when additional subscribers are added.

With continuing reference to FIG. 3, The ONU 18 further includes digital and/or electrical circuitry 42 which is configured to condition the electrical signals, perform any frequency conversion thereon as needed, and/or provide any desired digital signal processing. In an exemplary embodiment, the electrical downlink signals from the transceiver 40 are converted to an EHF downlink signal. The ONU 18 further includes a wireless transceiver 44 configured to transmit the EHF downlink signals through the antenna 20 to the subscriber unit 13 and receive EHF uplink signals from the subscriber unit 13 through the antenna 20. EHF uplink signals may be passed to the electrical circuitry 42, which may convert the EHF uplink signals to an intermediate frequency (IF) electrical uplink signal. Alternatively, the electrical circuitry 42 may convert the signal to a digital baseband signal if desired. In an exemplary embodiment, the wireless transceiver 44 is a mm-wave wireless transceiver. As noted above, an EHF signal is a high bandwidth signal that performs well over distances under two km where line of sight transmission is available. In the event that the optical downlink signal is not in the EHF range, the electrical circuitry 42 converts the electrical downlink signal to the desired EHF range. Alternatively, the optical downlink signal may be a purely digital signal, in which case the electrical circuitry 42 may merely condition the signal and up-convert the signal to the desired EHF range.

Figure 4:
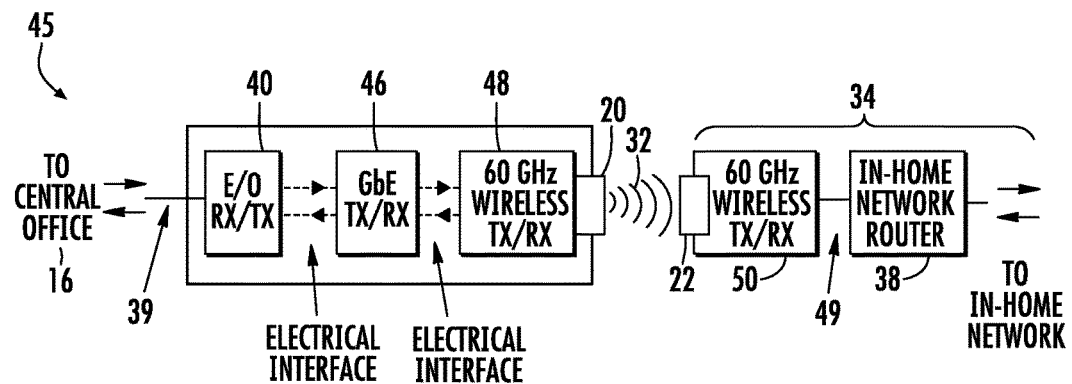
FIG. 4 is a more detailed exemplary embodiment of FIG. 3, operating at 60 GHz.

Subscriber module 35 of FIG. 3 is a relatively high level presentation of the components of the subscriber module 35. In contrast to the high level presentation of FIG. 3, FIG. 4 offers a slightly more detailed exemplary embodiment of a subscriber module 45. The ONU 18 includes an electrical/optical converter and transceiver 40 as before, but the digital circuitry 42 is more specifically a digital signal processor (DSP) and a Gigabit-Ethernet (GbE) transceiver 46, and the wireless transceiver 44 is more specifically a 60 GHz transceiver 48. Similarly, the subscriber hardware 34 includes a 60 GHz wireless transceiver 50 and the electrical interface 41 is more accurately a CAT6 cable 49. This embodiment is appropriate if the fiber network 14 operates according to a Gigabit-Ethernet protocol and the DSP allows logical (protocol-level) termination of the optical network and the re-coding of the signal in preparation for frequency up conversion to the EHF range for transmission by the 60 GHz transceiver 48. Using a transceiver with a given protocol (such as GbE or 10 GbE or the like) in the ONU 18 allows the ONU 18 to be remotely addressable for control and management purposes. Likewise, having the DSP capability in the ONU 18 allows for remote programming of each individual ONU 18(1)-18(N) as well as allow for protocol translation (e.g., converting the GbE protocol to a different protocol suited for 60 GHz transmission and vice versa). Such flexibility comes at the cost of increased hardware expense, but certain implementations may justify this tradeoff and are considered within the scope of the present disclosure.

Figure 5:
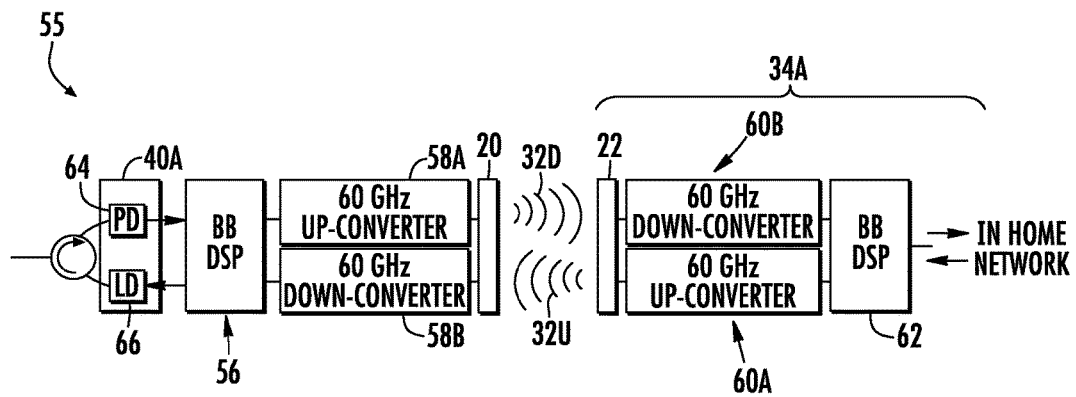
FIG. 5 is an even more detailed exemplary embodiment of FIG. 3, with particular exemplary optical/electrical components illustrated.

FIG. 5 provides a more detailed version of an exemplary subscriber module, and in particular illustrates subscriber module 55. In subscriber module 55, the ONU 18 includes an electrical/optical converter 40A, which is formed from a photodiode (PD) 64 to convert optical downlink signals to electrical downlink signals and a laser diode (LD) 66 to convert electrical uplink signals to optical uplink signals. The digital circuitry 42 specifically includes a baseband DSP 56. The wireless transceiver 44 more specifically includes a 60 GHz frequency up-converter 58A to convert the electrical downlink signals from the baseband DSP 56 to approximately 60 GHz wireless downlink signal and a 60 GHz down-converter 58B to convert the EHF uplink signal to a baseband electrical uplink signal. Likewise, the subscriber hardware 34A includes a frequency up-converter 60A and a frequency down-converter 60B to convert uplink and downlink signals respectively. The subscriber hardware 34A further includes a baseband DSP 62 for further manipulation of uplink and downlink signals. In an exemplary embodiment, the antenna 20 may be a patch antenna array.

Figure 6:
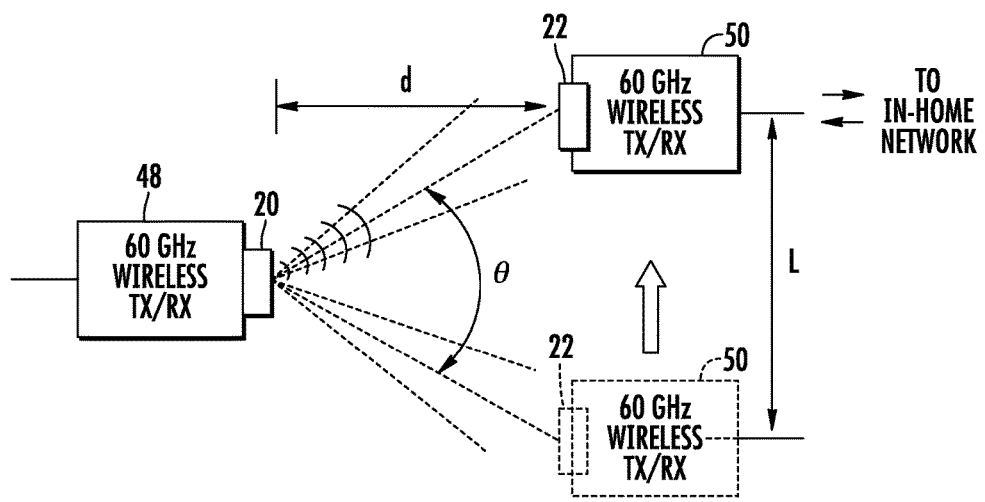
FIG. 6 is an exemplary embodiment of beam steering technology that may be used by certain embodiments of the present disclosure.

FIG. 6 illustrates an exemplary antenna 20 suitable for use with the present disclosure. In particular, the antenna 20 may be a beam forming or beam steering antenna. Use of a beam steering antenna allows for easy installation of the antenna 20 and the subscriber antenna 22 so long as line of sight is available between both antennas. In one example, the minimum placement offset (perpendicular) range in one plane is given by L=2d*Tan(θ/2) for maximum link gain, where θ and d represent the maximum beam steering angle of the antennas and the distance between the two antennas respectively. Thus, the wireless transceivers and antennas may be placed without precise angular alignment and still be able to establish a best case line of sight link. In an exemplary embodiment, auto-alignment algorithms may be implemented in a DSP module (e.g., DSP 56) or an integrated DSP sub-module (not illustrated). The beam steering may be used at frequencies other than the 60 GHz illustrated.

While use of the wireless link 32 allows network connection providers to eliminate the need for extending fiber optical cable (or other physical medium) to the subscriber unit 13, the use of the wireless link 32 may present other factors. One relevant factor that can arise by use of the wireless line 32 is possible interference between different ONUs 18 and subscriber units 13. That is, proximate ONUs 18 and subscriber units 13 may send signals that are inadvertently received by other elements in the network. This inadvertent reception may be conceptualized as a form of undesirable crosstalk. A simple illustration of interference is provided with reference to FIG. 7, where ONU 18A may transmit a signal 70A that is received by ONU 18B and ONU 18B transmits a signal 70B that is received by ONU 18A. While beam steering can avoid or reduce some inadvertent mutual interference, physical proximity of subscriber units 13 may not make it possible to completely eliminate interference with beam steering. The present disclosure provides additional solutions below. The additional solutions are not mutually exclusive and can be used as desired by network designers to optimize the network.

Figure 8:
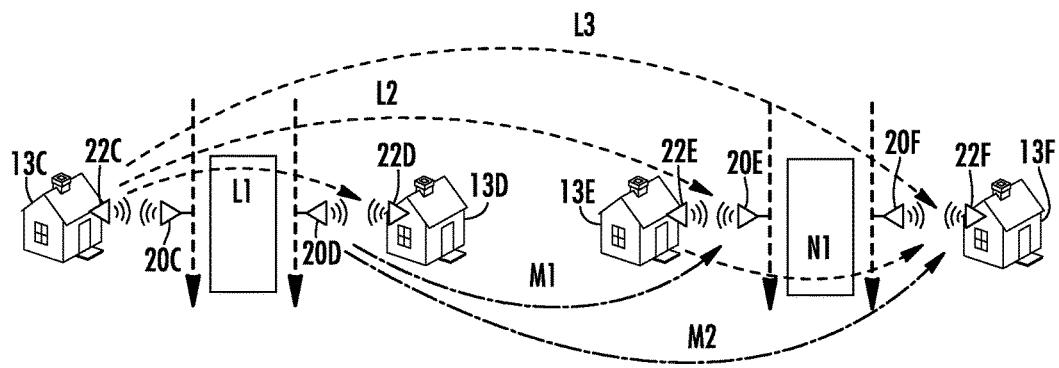
FIG. 8 is a more challenging exemplary diagram illustrating how subscriber unit communications may interfere with one another.
Figure 9:
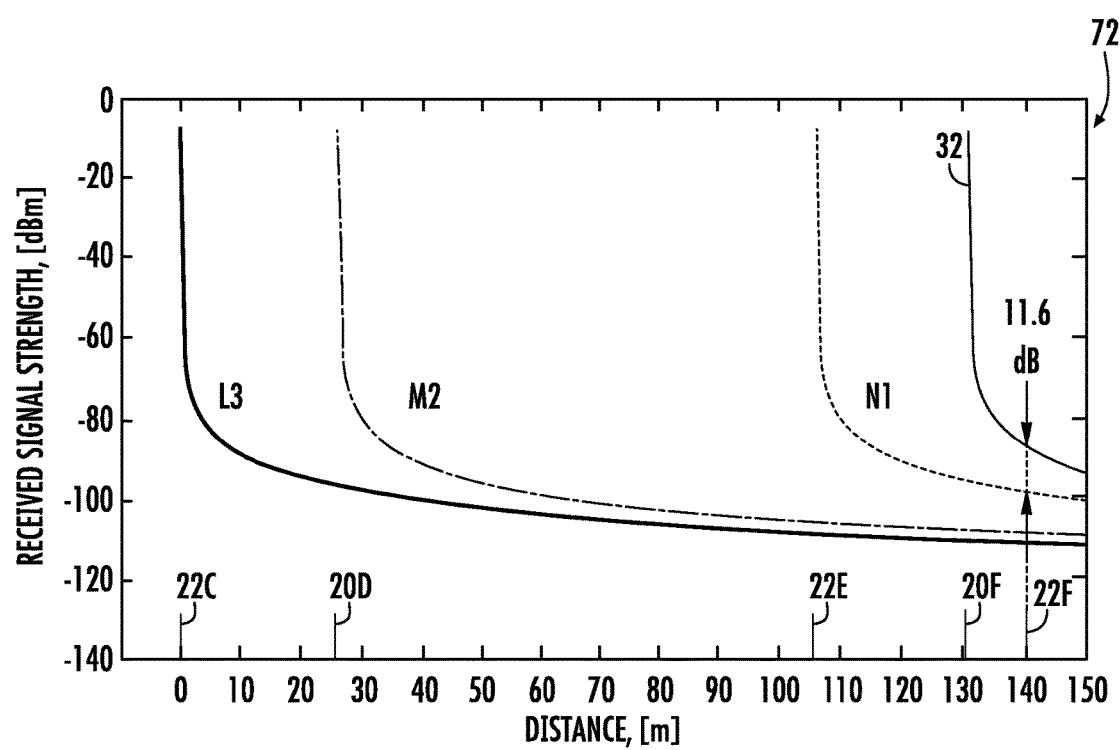
FIG. 9 is an exemplary graph illustrating exemplary interference levels between subscriber units.

FIG. 8 illustrates another interference scenario where several subscriber units 13 are in close physical proximity and mutual interference exists between four subscriber units 13C-13F. The close physical proximity of the subscriber units 13 reduces the effectiveness of beam steering and requires some of the additional solutions alluded to above. However, before introducing such additional solutions, FIGS. 8 and 9 are provided to illustrate the scope of interference that may occur in an exemplary network. As illustrated, signals from antenna 22C may be received by antenna 20C, and extra antennas 22D, 20E, and 22F (signal paths L1, L2, and L3 respectively). Signals from antenna 20D may be received by antenna 22D and extra antennas 20E and 22F (signal paths M1 and M2 respectively). Signals from antenna 22E may be received by antenna 20E as well as extra antenna 22F (signal path N1). While a few particular examples are provided, it should be appreciated that other antennas experience comparable interference.

FIG. 9 illustrates a graph 72 showing calculated received signal strengths for the various signals at antenna 22F assuming the distances as noted and 60 GHz. That is, the signals on interfering signal paths L3, M2, and N1, which are all received by antenna 22F are compared to the basic wireless link 32. In the illustrated example, the difference between wireless link 32 and the signal from signal path N1 is only 11.6 dB in this example. Note further that graph 72 illustrates effective transmission distances. That is, while it is expected that the average length of wireless link 32 will be approximately twenty meters or less, a viable signal may be sent at distances of over one hundred meters. Note that to derive graph 72, propagation loss was calculated from $\alpha_{loss}=(4\pi d/\lambda)^2+\alpha_{air}$, where d is the propagation distance, λ is the signal wavelength, and $\alpha_{air}$ is the atmospheric absorption.

Figure 7:
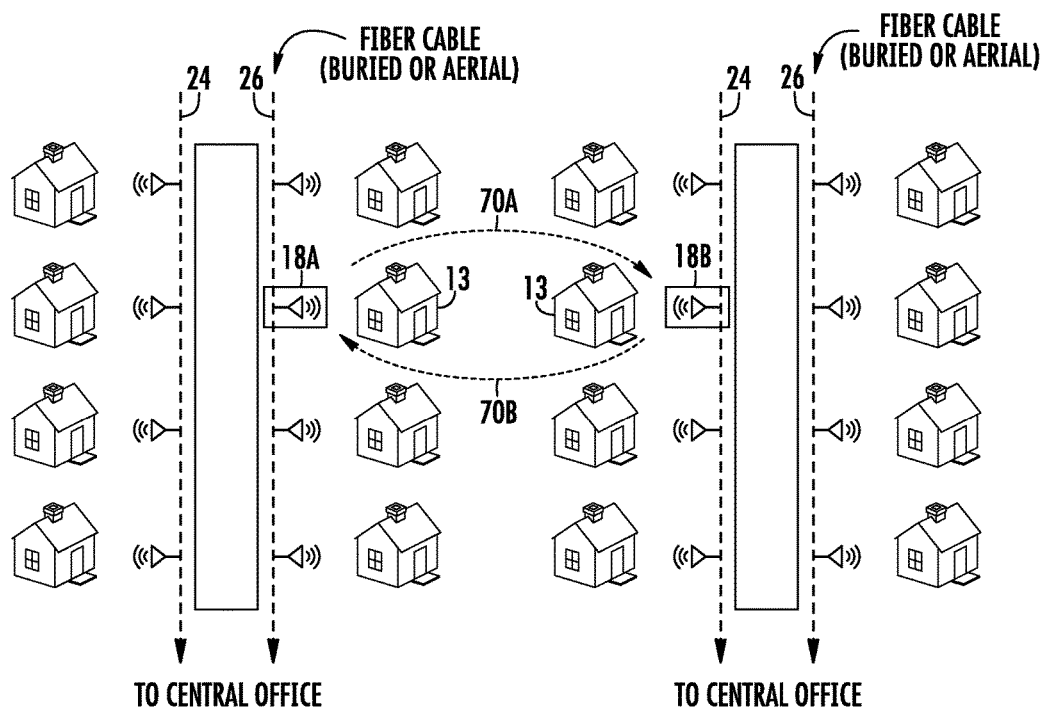
FIG. 7 is a simplified exemplary diagram illustrating how subscriber unit communications may interfere with one another.
Figure 10A:
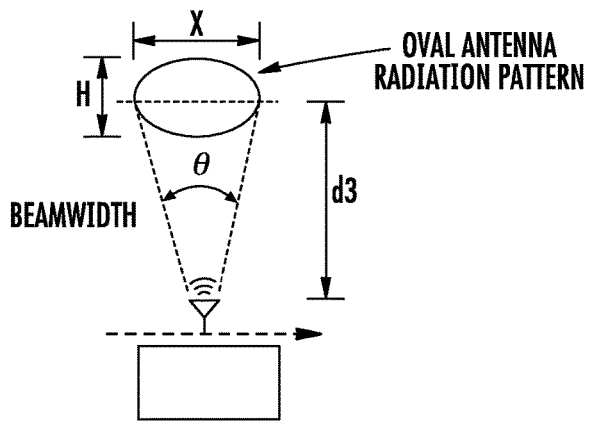
FIGS. 10A & 10B illustrate exemplary structural techniques which may be used to help reduce interference.
Figure 10B:
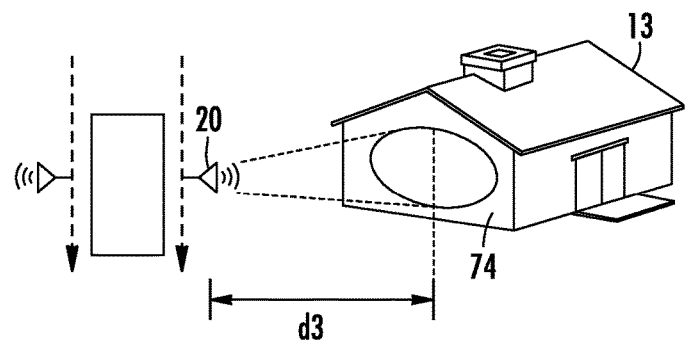

To address the interference illustrated in FIGS. 7-9, a variety of exemplary techniques may be used alone or in conjunction. A first technique is to use the physical structure of the subscriber unit 13 to block the signal. Using the physical structure works because most building materials are opaque to EHF radiation. That is, brick, aluminum siding, concrete, wood paneling, drywall, and other such materials all severely attenuate signals in the EHF. Where there is a reflection from such material, the surface is rarely uniform, so the reflections are severely scattered and lose coherence such that any such reflections do not contribute materially to any interference at another subscriber unit 13. A second technique is to use an oval radiation pattern. The combination of these two techniques is illustrated in FIGS. 10A & 10B. Specifically, FIG. 10A illustrates an oval radiation pattern with θ being the horizontal beamwidth, x being the horizontal cross section, H being the vertical height, and d3 being the distance from the antenna 20 to the antenna 22. The object is to restrict the radiation pattern of the antenna to within the area of a wall 74 as shown in FIG. 10B. This arrangement minimizes unwanted signal radiation from passing around the edges of the subscriber unit 13. The wall 74 also shields the ONU 18 from receiving interfering signals during uplink transmission.

Figure 11:
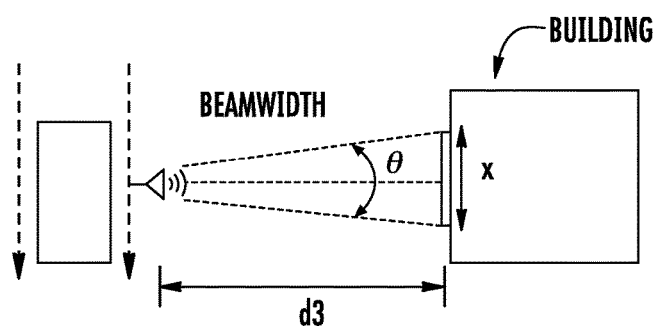
FIG. 11 is another exemplary structural technique which may be used to help reduce interference.

To help illustrate how beam forming and physical structures may be used to reduce interference, FIG. 11 illustrates increasing the directivity (gain) of the antenna 20 such that the majority of the antenna radiation falls within the wall 74. As noted above, building materials such as those incorporated into the wall 74 help block the signals and thus reduce the opportunity for interference. The required minimum cross section length of the wall 74 is given by x=2d*Tan(θ/2), where d (d3 in FIG. 11) is the distance between the antenna 20 and the wall 74, θ is the beamwidth.

Figure 12:
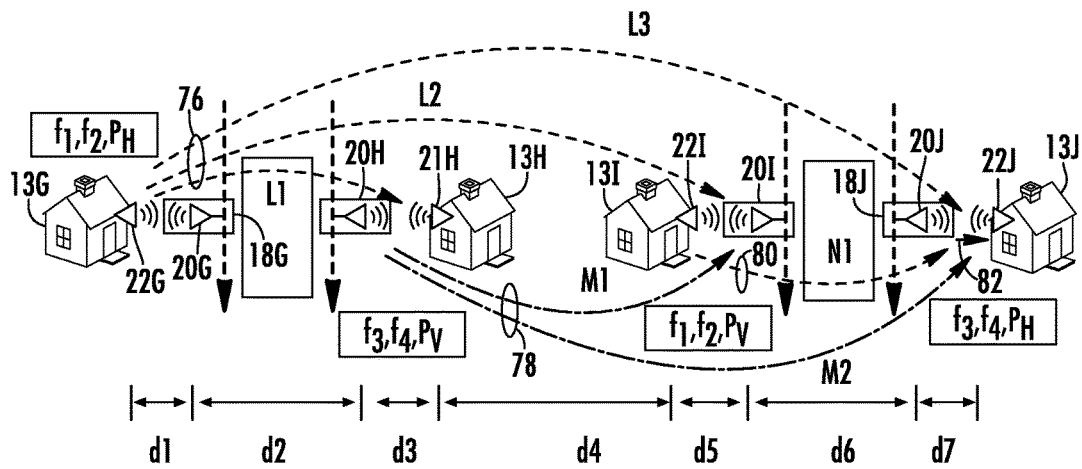
FIG. 12 is an exemplary robust communication scheme in a neighborhood to reduce interference.

FIG. 12 illustrates two additional exemplary techniques for reducing interference within a wireless system and particularly for preventing ONUs 18 from interfering with nearby subscriber units 13 and also for preventing subscriber units 13 from interfering with nearby ONUs 18. In this exemplary embodiment, subscriber units 13G-13J are provided with respective antennas 22G-22J. Corresponding ONUs 18G-18J are also provided. In particular, the signals are frequency division multiplexed and the antennas operate at different polarizations. Thus, the signals 76 intended to go to and from antennas 20G, 22G may occur at f1, f2 and $P_H$ (horizontal polarization), while signals 78 intended to and from the antennas 20H, 22H may occur at f2, f3 and $P_V$ (vertical polarization). Similarly, the signals 80 intended to go to and from antennas 20I, 22I may occur at f1, f2 and $P_V$, while the signals 82 intended to go to and from antennas 20J, 22J may occur at f1, f2, and $P_H$.

Figure 13:
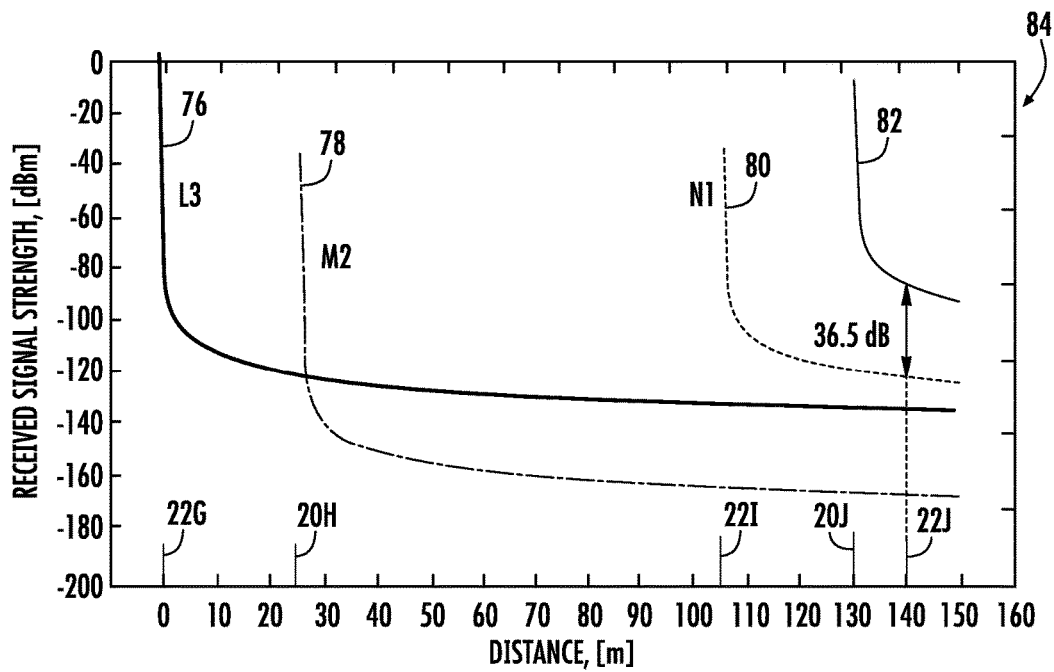
FIG. 13 is an exemplary graph illustrating reductions in interference levels, especially as compared to those set forth in FIG. 9.

Using the techniques set forth with reference to FIG. 12, results comparable to graph 84 in FIG. 13 are possible. As is readily seen, the alternating frequency, and alternating antenna polarization allows the interference to be dropped to 36.5 dB below the desired signal 82. Note that signal blocking was not used in this embodiment. If signal blocking were used, even lower interference levels would be attained.

Thus, as is readily apparent, the present disclosure provides a wireless link from the fiber optical cable on the street to the subscriber unit helping to provide a high bandwidth communications link without the need to secure permission to dig up a subscriber's property to bury a fiber optical cable all the way to the subscriber unit. Likewise, the present disclosure provides a number of techniques to reduce interference from proximate antennas on the same system.

In an exemplary embodiment, the ONU 18 may further include a WiFi component that may be used as a backup communication link in the event that weather or other transient event interferes with the wireless link 32. Circuitry may be provided that detects the status and/or condition of the wireless link 32 and activates the WIFI component accordingly.

Figure 14:
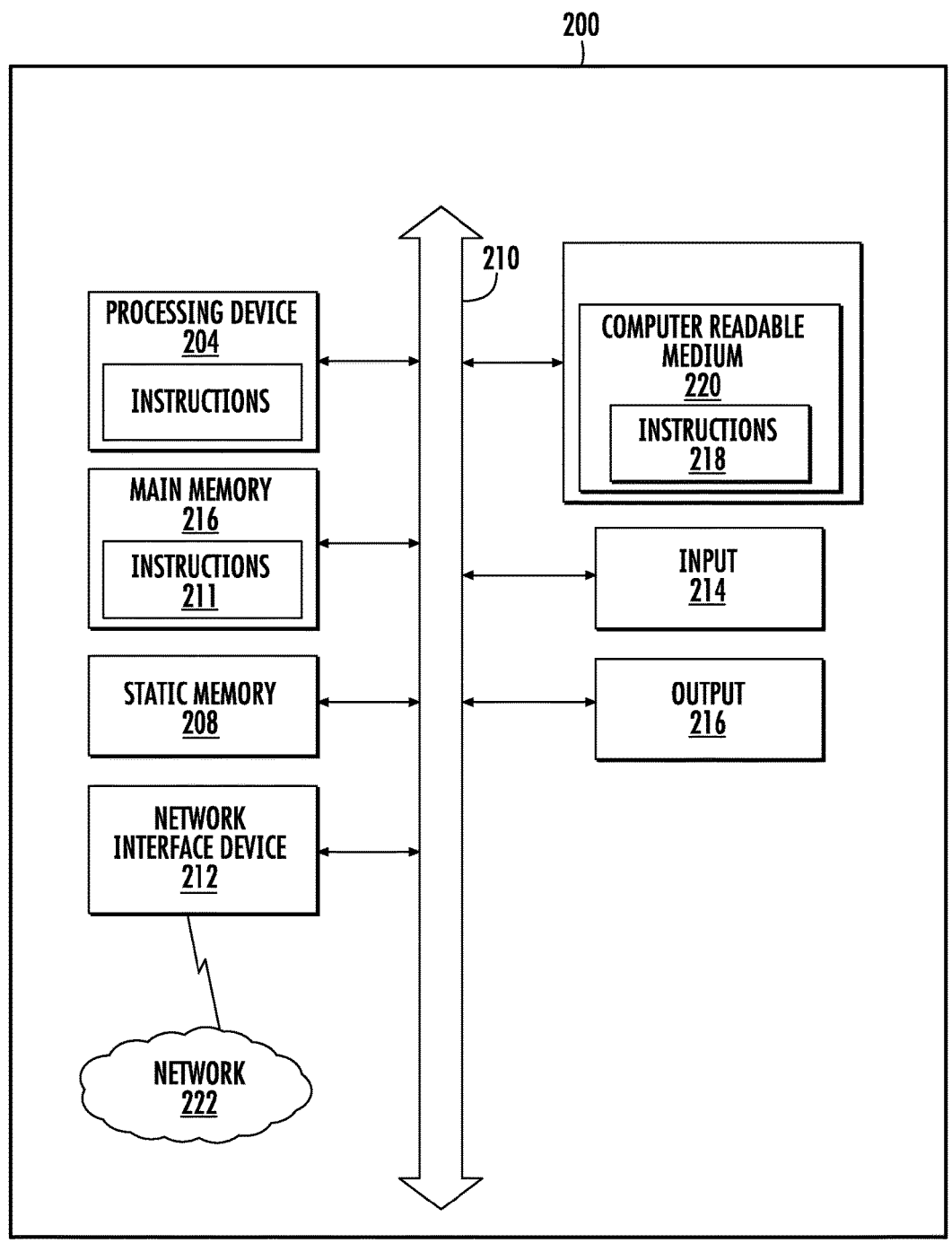
FIG. 14 is a schematic diagram of a generalized representation of an exemplary computer system that can be included in any of the modules provided in the exemplary integrated fiber-wireless systems and/or their components described herein, including but not limited to a head end controller (HEC), wherein the exemplary computer system is adapted to execute instructions from an exemplary computer-readable media.

The ONU 18 or the subscriber hardware 34 disclosed herein can include a computer system. In this regard, FIG. 14 is a schematic diagram representation of additional detail regarding the ONU 18 or subscriber hardware 34 in the exemplary form of an exemplary computer system 200 adapted to execute instructions from an exemplary computer-readable medium to perform power management functions. In this regard, the ONU 18 or subscriber hardware 34 may comprise the computer system 200 within which a set of instructions for causing the ONU 18 or subscriber hardware 34 to perform any one or more of the methodologies discussed herein may be executed. In an alternate embodiment, these methodologies may be implemented on an ASIC. The ONU 18 or subscriber hardware 34 may be connected (e.g., networked) to other machines in a LAN, an intranet, an extranet, or the Internet. The ONU 18 or subscriber hardware 34 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The elements within the ONU 18 or subscriber hardware 34 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 200 in this embodiment includes a processing device or processor 204, a main memory 216 (e.g., read-only memory (ROM), flash memory, dynamic random access memory (DRAM) such as synchronous DRAM (SDRAM), etc.), and a static memory 208 (e.g., flash memory, static random access memory (SRAM), etc.), which may communicate with each other via the data bus 210. Alternatively, the processing device 204 may be connected to the main memory 216 and/or static memory 208 directly or via some other connectivity means. The processing device 204 may be a controller, and the main memory 216 or static memory 208 may be any type of memory.

The processing device 204 represents one or more general-purpose processing devices such as a microprocessor, central processing unit, or the like. More particularly, the processing device 204 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 204 is configured to execute processing logic in instructions 211 for performing the operations and steps discussed herein.

The computer system 200 may further include a network interface device 212. The computer system 200 also may or may not include an input 214 to receive input and selections to be communicated to the computer system 200 when executing instructions. The computer system 200 also may or may not include an output 216, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 200 may or may not include a data storage device that includes instructions 218 stored in a computer-readable medium 220. The instructions 218 may also reside, completely or at least partially, within the main memory 216 and/or within the processing device 204 during execution thereof by the computer system 200, the main memory 216 and the processing device 204 also constituting computer-readable medium. The instructions 211 may further be transmitted or received over a network 222 via the network interface device 212.

While the computer-readable medium 220 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information may be represented using any of a variety of different technologies and techniques. For example, data, instructions, commands, information, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the antenna arrangements may include any type of antenna desired, including but not limited to dipole, monopole, and slot antennas. The distributed antenna systems or integrated fiber-wireless systems that employ the antenna arrangements disclosed herein could include any type or number of communications mediums, including but not limited to electrical conductors, optical fiber, and air (i.e., wireless transmission). The distributed antenna systems may distribute and the antenna arrangements disclosed herein may be configured to transmit and receive any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A system comprising:
a plurality of optical network units (ONUs); and
a plurality of subscriber units each comprising a subscriber building, wherein:
each of the plurality of ONUs is configured to communicate with one or more of the plurality of subscriber units and comprises:
an ONU antenna;
an optical fiber interface configured to communicate with an optical fiber network;
an optical/electrical converter configured to receive optical downlink signals at a first frequency from the optical fiber network through the optical fiber interface and convert the optical downlink signals to electrical downlink signals;
electrical circuitry configured to frequency convert the electrical downlink signals to extremely high frequency (EHF) downlink signals at an EHF; and
a wireless transceiver configured to transmit the EHF downlink signals over a wireless link to at least one of the plurality of subscriber units through the ONU antenna; and
each of the plurality of subscriber units further comprises:
a subscriber antenna configured to operate at an EHF range; and
a transceiver configured to receive the EHF downlink signals from the ONU,
wherein each of the wireless transceivers in each of the plurality of ONUs is configured to transmit the EHF downlink signals over the wireless link to a transceiver in one or more respective subscriber units of the plurality of subscriber units and the transceiver in the one or more respective subscriber units is configured to transmit the EHF downlink signals to subscriber hardware within an associated subscriber building such that the EHF downlink signals are received within the associated subscriber building,
wherein the wireless transceiver of each of the plurality of ONUs is configured to transmit the EHF downlink signals in an oval radiation pattern that is restricted an area within a wall of one or more of the subscriber buildings associated with one or more of the plurality of subscriber units such that the wall of the associated subscriber building shields one or more of the plurality of ONUs from receiving interfering signals by blocking the EHF downlink signals from propagating past the proximate subscriber building.

2. The system of claim 1, wherein the plurality of ONUs reduces mutual interference between one or more of the plurality of ONUs and one or more of the plurality of subscriber units through frequency domain multiplexing (FDM).

3. The system of claim 1, wherein the plurality of ONUs reduces mutual interference between one or more of the plurality of ONUs and one or more of the plurality of subscriber units through orthogonal antenna polarizations.

4. The system of claim 1, wherein the wireless transceiver in each of the plurality of ONUs is further configured to receive EHF uplink signals from one or more of the plurality of subscriber units through the ONU antenna and pass the EHF uplink signals to the electrical circuitry.

5. The system of claim 4, wherein the electrical circuitry is further configured to frequency convert the EHF uplink signals to an electrical signal and pass the electrical signal to the optical/electrical converter.

6. The system of claim 5, wherein the optical/electrical converter is further configured to receive the electrical signal and convert the electrical signal to an optical uplink signal for transmission on the optical fiber network.

7. The system of claim 1, wherein the EHF downlink signals occur in channels at approximately 60 GHz.

8. The system of claim 1, further comprising beam steering circuitry configured to direct transmitted EHF downlink signals to the subscriber antenna at one or more of the plurality of subscriber units.

9. The system of claim 1, wherein the electrical circuitry of each of the plurality of ONUs further comprises a digital signal processor configured to allow for remote programming of the plurality of ONUs and allow for protocol translation.

10. The system of claim 1, wherein the subscriber antennas are located at different heights or positions on the plurality of subscriber units.

11. The system of claim 10, wherein the ONU antennas of the plurality of ONUs are positioned on a mast.

12. A system comprising:
a central office;
a plurality of optical network units (ONUs);
an optical fiber network communicatively coupling the central office with one or more of the plurality of ONUs, wherein the optical fiber network comprises one or more fiber optic cables coupled to one or more of the plurality of ONUs; and
a plurality of subscriber units comprising a subscriber building,
wherein each of the plurality of ONUs is configured to communicate with one or more of the plurality of subscriber units, each of the plurality of ONUs comprising:
an ONU antenna;
an optical fiber interface configured to communicate with the optical fiber network;
an optical/electrical converter configured to receive optical downlink signals at a first frequency from the optical fiber network through the optical fiber interface and convert the optical downlink signals to electrical downlink signals;
electrical circuitry configured to frequency convert the electrical downlink signals to extremely high frequency (EHF) downlink signals at an EHF; and
a wireless transceiver configured to transmit the EHF downlink signals over a wireless link to at least one of the plurality of subscriber units through the ONU antenna; and
each of the plurality of subscriber units further comprising:
a subscriber antenna configured to operate at an EHF range; and
a wireless transceiver configured to receive the EHF downlink signals from the ONU and communicate the EHF downlink signals to a network router in the subscriber building;
wherein each of the wireless transceivers in each of the plurality of ONUs is configured to transmit the transmit the EHF downlink signals over the wireless link to a transceiver in one or more respective subscriber units of the plurality of subscriber units to be transmitted to subscriber hardware within an associated subscriber building such that the EHF downlink signals are received within the associated subscriber building;
wherein the wireless transceiver of each of the plurality of ONUs is configured to transmit the EHF downlink signals in an oval radiation pattern that is restricted an area within a wall of one or more of the subscriber buildings associated with one or more of the plurality of subscriber units such that the wall of the associated subscriber building shields the ONU from receiving interfering signals by blocking the EHF downlink signals from propagating past the proximate subscriber building;
wherein at least one of the plurality of subscriber units is configured to be secured to the associated subscriber building such that the associated subscriber building blocks the EHF downlink signals transmitted by beam steering circuitry from propagating past the associated subscriber building; and
wherein the plurality of ONUs reduces mutual interference between one or more of the plurality of ONUs and one or more of the plurality of subscriber units through one or both of frequency domain multiplexing (FDM) and orthogonal antenna polarizations.

13. The system of 12, wherein one or more of the plurality of subscriber units is connected to one or more of the plurality of ONUs by one or more fiber optic cables and is configured to communicate with the one or more of the plurality of ONUs via the one or more fiber optical cables, while one or more of the plurality of subscriber units are only communicatively coupled to one or more of the plurality of ONUs via the wireless link.

* * * * *

UNITED STATES PATENT AND TRADEMARK OFFICE
CERTIFICATE OF CORRECTION

PATENT NO. : 10,530,479 B2
APPLICATION NO. : 15/241247
DATED : January 7, 2020
INVENTOR(S) : Bruce Cinkai Chow et al.

Page 1 of 1

It is certified that error appears in the above-identified patent and that said Letters Patent is hereby corrected as shown below:

On the Title Page

On page 2, in Column 2, item (56), U.S. Patent Documents, Line 31, delete "10/2002" and insert -- 9/2002 --, therefor.

On page 4, in Column 1, item (56), Other Publications, Line 20, delete "Internation" and insert -- International --, therefor.

On page 4, in Column 1, item (56), Other Publications, Line 21, delete "(PIMRC" and insert -- (PIMRC) --, therefor.

On page 4, in Column 2, item (56), Other Publications, Line 10, delete "Focai" and insert -- Focal --, therefor.

In the Claims

In Column 14, Line 20 (approx.), Claim 12, after "transmit" delete "the transmit".

In Column 14, Line 48 (approx.), Claim 13, after "of" insert -- claim --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*